(12) United States Patent
Zimniewicz et al.

(10) Patent No.: US 7,320,068 B2
(45) Date of Patent: Jan. 15, 2008

(54) SYSTEMS AND METHODS TO MIGRATE A USER PROFILE WHEN JOINING A CLIENT TO A SERVER AND/OR DOMAIN

(75) Inventors: Jeff A. Zimniewicz, Bellevue, WA (US); Paul R. Fitzgerald, Woodinville, WA (US); Brian G. Strully, New Port, NH (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 10/455,048

(22) Filed: Jun. 5, 2003

(65) Prior Publication Data

US 2004/0260565 A1    Dec. 23, 2004

(51) Int. Cl.
*G06F 17/60* (2006.01)

(52) U.S. Cl. ............... 713/1; 726/6; 726/7; 713/2; 709/220; 709/221; 709/222; 709/225; 709/228

(58) Field of Classification Search ............... None
See application file for complete search history.

(56) References Cited

U.S. PATENT DOCUMENTS

| | | | |
|---|---|---|---|
| 5,768,519 A | 6/1998 | Swift et al. | |
| 6,564,247 B1 | 5/2003 | Todorov | |
| 6,636,808 B1 | 10/2003 | Brown et al. | |
| 6,636,961 B1 | 10/2003 | Braun et al. | |
| 6,643,650 B1 * | 11/2003 | Slaughter et al. | 707/10 |
| 2001/0044339 A1 * | 11/2001 | Cordero et al. | 463/42 |

OTHER PUBLICATIONS

Microsoft Corporation, 'Windows XP Professional and Office XP Deployment Planning Blueprint', © 2001 Microsoft Corporation, pp. 28, 35-41, http://download.microsoft.com/download/2/7/c/27ccf059-0463-48be-abd1-5c3d78ec8e84/WinXPOfficeXP.doc.*

Goopeel Chung, et al., A Mechanism for Supporting Client Migration in a Shared Window System, Proceedings of the 9th Annual ACM Symposium on User Interface Software and Technology, 1996, pp. 11-20, Seattle, Washington.

(Continued)

*Primary Examiner*—Nasser Moazzami
*Assistant Examiner*—Ronald Baum
(74) *Attorney, Agent, or Firm*—Amin, Turocy & Calvin, LLP

(57) ABSTRACT

The present invention relates to systems and methods to generate accounts on a client when joining the client to a domain while preserving user profiles that were generated prior to joining the client. In general, a user with an account on a client can customize the account, wherein the customization can be saved in an associated profile. The client can employ the user profile when the user logs on in order to return the customization to the user. The present invention provides a novel approach to retain a user's existing user profile when joining the client via mapping the user's existing account to the account that will be generated, and then automatically migrating the user's profile to the generated account during joining the client. The foregoing can provide reduced client setup time, improved setup efficiency, reduced setup cost, and mitigation of severing customization from a user's account.

40 Claims, 8 Drawing Sheets

OTHER PUBLICATIONS

Hoang Nguyen Minh, et al., User Profile Replication with Caching for Distributed Location Management in Mobile Communication Networks, Proceedings of the 2001 ACM Symposium on Applied Computing, 2001, pp. 381-386, Las Vegas, Nevada.

Steven Osman, et al., The Design and Implementation of Zap: A System for Migrating Computing Environments, ACM SIGOPS, 2002, pp. 361-376, vol. 36, No. SI.

* cited by examiner

SYSTEMS AND METHODS TO MIGRATE A USER PROFILE WHEN JOINING A CLIENT TO A SERVER AND/OR DOMAIN

TECHNICAL FIELD

The present invention generally relates to computer accounts, and more particularly to systems and methods to migrate a user's profile from one account to another during joining the computer to a domain.

BACKGROUND OF THE INVENTION

A computer network typically comprises a plurality of computers, software, and hardware employed to facilitate interaction between at least two computers in order to provide a fast, efficient and cost effective means to exchange information. In many instances, other microprocessor-based devices such as printers, scanners and facsimile machines are coupled to the computer network to enhance the exchange of information. The foregoing advantages provided by computer networks are typically exploited by corporations, medical facilities, businesses, the government, and educational facilities, wherein computer networks are employed to improve everyday tasks such as correspondence (e.g., via email, instant messaging and chat rooms), documentation, problem solving, mathematical computation, scheduling, planning, and information gathering.

In general, computer networks can be categorized and differentiated through characteristics such as size and user base, architecture, and topology. For example, a network can be deemed a Local Area Network (LAN) or a Wide Area Network (WAN). A LAN is typically associated with a relatively small geographic area such a department, building or group of buildings, and employed to connect local workstations, personal computers, printers, copiers, and scanners. A WAN is typically associated with networks that span large geographical areas, and can include one or more smaller networks, such as one or more LANs. For example, a WAN can be employed to a couple computers and/or LANs that reside on opposite ends of a country and/or world. For example, the most popular WAN today is the Internet.

The increased popularity in configuring networks to meet user needs and optimizing networks for environments has lead to further network user base delineations, for example campus area networks (CANs), metropolitan area networks (MANs), and home area networks (HANs). In general, a CAN is associated with a limited geographic area, such as a campus or military base, a MAN is designed for a town or city, and a HAN resides within a user's home to connect digital devices such as computers, home monitoring system (e.g., lighting and temperature), entertainment centers (e.g., audio and video systems) and security (e.g., alarm and CCD cameras) systems.

Architectural differentiation includes classifications such as a peer-to-peer and client/server networks. With a peer-to-peer architecture, computers are connected to one another (e.g., via a hub) and share the same level of access on the network. In addition, the computers can be configured with security levels and/or sharing rights such that files can be directly accessed and shared peer to peer, or between computers. In contrast, a client/server network comprises at least one client machine, which can be a user's computer, and a server, which typically is employed to store and execute shared applications. One advantage of employing a client/server configuration is that it can free local disk space on clients by providing a central location for file storage.

Common topologies classifications include bus, ring and star topologies. With a bus topology, a central channel or backbone (the bus) couples computers and/or devices on the network. With a ring topology, computers and/or devices are coupled as a closed loop. Thus, information may travel through the several computers in order to convey information from one computer to another. With a star topology, computers and/or are connected to a central computer.

In many instances, it can be advantageous to join clients to an existing network and/or switch networks. For example, a company employing a peer-to-peer network may decide to switch to a client/server network in order to realize the advantages provided by such a network. However, when joining a client to a network, the existing accounts and the associated account information such as user profiles are not retained, and new accounts are generated. Thus, users who had customized their accounts prior to joining the client to the domain will not retain the account customization after the client has been joined.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that can be employed to migrate account information from one account to another account during joining a client to a domain. For example, a user account on a client is typically associated with account information such as a user profile, which is typically employed to save account customization. When the client is joined to a domain, a new account is generated for the user, and the previous account and account information is not retained. The present invention provides a novel approach to retain the existing account information via automatically migrating the user's account information to the user's generated account during client joining. The foregoing can provide for reduced client setup time, improved setup efficiency, reduced setup cost, and mitigation of losing account customization.

In general, one or more users accounts can be generated on a client (e.g., a computer). Typically, a user with an account is provided with a logon and password that can be employed to access the client. After logging on to the client, a profile associated with the user account is generated. The profile can include environment variables, settings, attributes, preferences, color schemes, themes, favorites, appearance, and configuration for installed applications. The client can then utilize the profile during subsequent logons by the user in order to resume the customization to the user. In addition, the user can vary the customization during any logon session, wherein the profile is reconstructed, regenerated or updated to reflect the present customization, and then employed during the next logon.

Conventionally, and as briefly noted above, when a client is joined to a domain, the accounts and account information that were established prior to the join are not retained. Instead, new accounts, user profiles and other account information are generated. Thus, any account information such as customization that existed prior to joining the client is abandoned, and the user is provided with a new account and default account information. The present invention mitigates severing a user's account information from the user via providing a mechanism to map the user's existing account, and hence account information, to the account that will be generated, and then migrating the account information to the generated account during client joining.

In one aspect of the present invention, a system comprising an input component an account management component that can be employed to generate accounts on a client and to migrate account information to the generated accounts during joining the client to a domain is provided. The input component can be utilized to facilitate obtaining information indicative of the accounts to be generated and the account information to be migrated and/or a file (e.g., XML) that includes such information. For example, the input component can be employed in connection with a user interface (UI), a graphical user interface (GUI) and/or a command line interface in order to interact with a network administrator to obtain the information and/or file.

The account management component can utilize the information and/or file obtained by the input component to generate the accounts on the client and to migrate the account information to the generated accounts. Typically, the account management component employs a mechanism to construct an XML file that includes the information, if an XML with the information does not already exist. Then, the account management component creates an administrative account and automatically logs on to the client. Once logged on, the account management component can load the XML file into memory, generate the accounts and migrate the account information. After booting, the client can employ the migrated account information in order to provide a user with the customization associated with the user's previously established account.

In another aspect of the present invention, a system comprising a storage medium, a user interface (UI), a packager, and an account creator that can be employed to create accounts on a client and migrate user profiles from existing accounts to the generated account during joining the client to a domain is provided. The UI can be employed to facilitate selecting accounts to create and mapping user profiles. For example, the UI can be utilized to provide the available domain users, wherein users can be selected from the available domain users to denote the users that will be provided with an account. Then, the selected users can be mapped to existing user use profiles via mapping the selected users to existing accounts. The packager can be employed to suitably bundle information indicative of the selected user and mapped user profiles for deployment by the account creator. Typically, the information is packaged in an XML based file. The account creator can then employ the file during joining the client to create the accounts and migrate the user profiles.

In yet another aspect of the present invention, a system is provided that remotely migrates and/or ports user profiles from one or more clients to one or more clients over a network. The system can be employed to migrate and/or port account information during joining a client to a domain, and/or port account information to client already joined to the domain. In other aspects of the present invention, methodologies are provided to generate accounts and migrate account information during joining the client to a domain. In still other aspects, an exemplary GUI and exemplary XML-based pseudo-code that can be employed with the novel aspects of the present invention are provided. The exemplary GIU provides a basic interface to facilitate selecting the users that will be provided with an account after joining the client and mapping existing accounts to the selected accounts to migrate account information such as user profiles. The exemplary XML pseudo-code provides a basic architecture to denote and delineate the accounts selected to be generated and to map the account information for existing accounts to the accounts to be generated.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
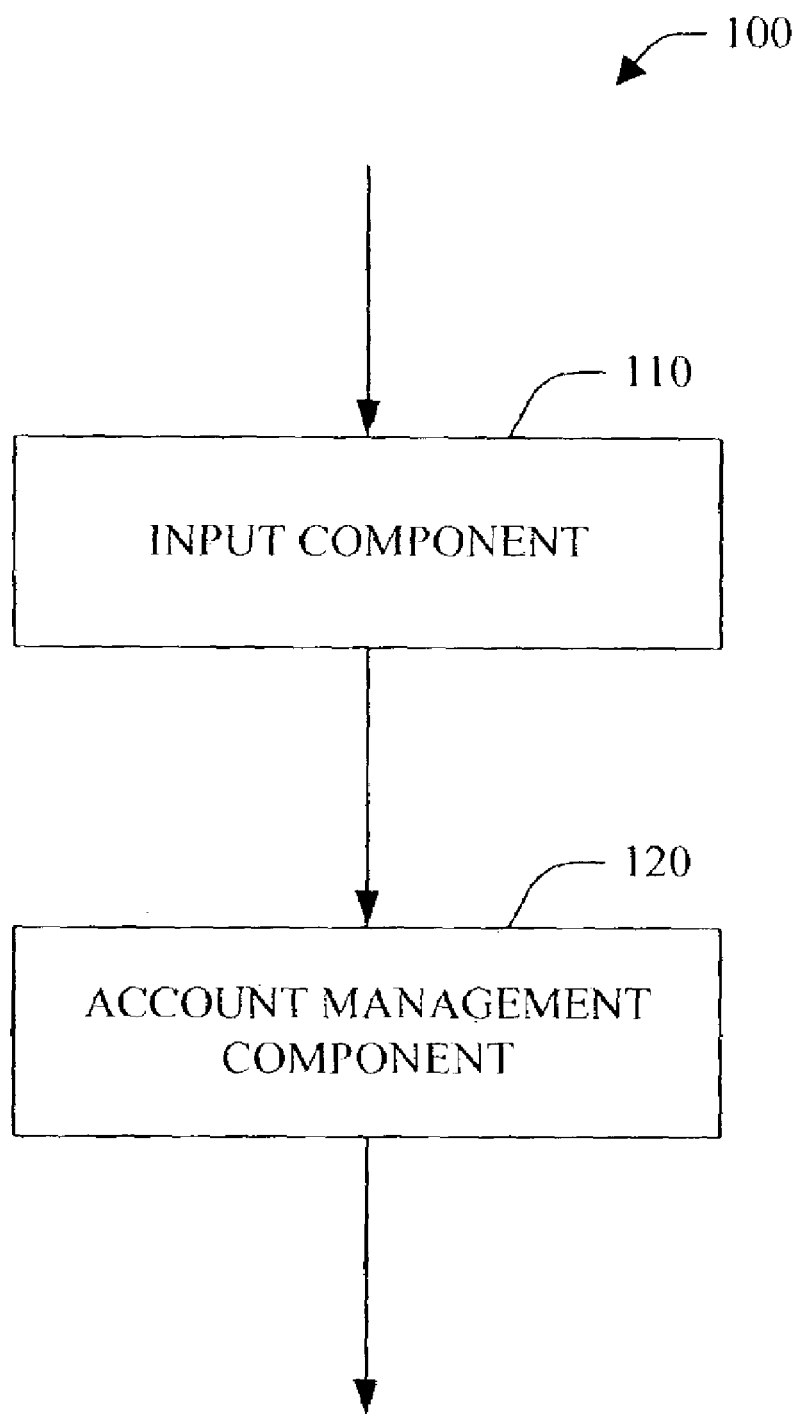
FIG. 1 illustrates an exemplary system to migrate account information to generated accounts when joining a client to a domain, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention relates to systems and methods to migrate account information associated with an existing account on a client to a subsequently generated account on the client during joining the client to a domain. Conventionally, existing accounts and account information are not retained when the client is joined to a domain. Instead, new accounts are generated. Account information such as customization can be returned to the user via manually configuring the generated accounts with substantially similar configuration; however, numerous steps are typically involved, which can be time consuming and increase client setup costs. In addition, manual configuration techniques are susceptible to errors, which can result in the need to rebuild the client. The present invention mitigates severing account information from a user when joining a client via providing mechanisms to migrate selected account information to the generated accounts during joining.

Referring to FIG. 1, an exemplary system 100 that can be employed to generate accounts on a client, and to migrate account information associated with existing accounts on the client to the generated accounts when joining the client to a domain, in accordance with an aspect of the present invention, is illustrated. The system 100 comprises an input component 10 and an account management component 120.

The input component 110 can be utilized to obtain information indicative of the accounts to be generated and the account information to be migrated during client joining. For example, the input component 110 can obtain information such as a list of the accounts to be generated, indicia signifying one or more users from a group of available users wherein accounts are to be generated for the one or more users, an association between existing accounts and the accounts to be generated, a mapping between existing account information and the accounts to be generated, and/or the account information to be migrated. It is to be appreciated that the account information can include user profiles, which typically comprise the account's customization. For example, when accounts are generated on a client, individual profiles are generated for individual accounts, wherein a user can customize an associated account via configuring account attributes, settings, preferences, color schemes, themes, favorites and appearance, for example. The configuration can then be saved in the user's profile, and employed during subsequent logons to restore the customization to the user.

In one aspect of the present invention, the input component 110 can obtain the information indicative of the accounts to be generated and the account information to be migrated in connection with an interface. For example, an operator (e.g., an account or network administrator) setting up the client can provide input to the client through the interface (e.g., user interface (UI) and graphical user interface (GUI)) via selecting users for account generation and mapping existing account information to the selected users for account information migration. In another example, the input component 110 can obtain the information indicative of the accounts to be generated and the account information to be migrated through a command line interface. For example, the operator can employ a script to convey the accounts to be generated and/or the account information to be migrated to the input component 110. In another aspect of the present invention, the input component 110 can receive and/or retrieve a file(s) that includes information indicative of the accounts to be generated and the account information to migrate. For example, a markup language (e.g., XML) file that includes the information can be provided to the input component 110. In yet another aspect of the present invention, the input component 110 can include an interface (e.g., as described above) to operatively interact with the operator to obtain the information indicative of the accounts to be generated and the account information to be migrated.

In addition, the input component 110 can be utilized to convey the information indicative of the accounts to be generated and the account information to be migrated to the account management component 120. For example, the information and/or the file obtained can be conveyed, as obtained. In another aspect of the present invention, the information and/or file can be manipulated prior to conveyance. For example, the information indicative of the accounts to be generated and the account information to be migrated can be packaged in a markup language (e.g., XML, HTML, XHTML and DAML) file, a compressed file and/or an encrypted file prior to being conveyed to the account management component 120. In yet another aspect of the present invention, a portion of the obtained information and/or additional information can be conveyed to the account management component 120. For example, the account information can be modified prior to and/or concurrently with conveyance, thus providing a mechanism to change account configuration during account setup. In another example, additional information can be included, for example to designate an account setup priority, to provide a security policy to mitigate migrating invalid account information, to initiate a corruption detecting mechanism (e.g., a virus scan), and/or to verify compatibility.

The account management component 120 can obtain the information indicative of the accounts to be generated and the account information to be migrated from the input component 110. In addition, the account management component 120 can be employed to modify the information prior to deployment. For example, the account management component 120 can package (e.g., encapsulate, construct, assemble, create and form) the obtained information in a file (e.g., as described above), if not previously packaged. In another example, the account management component 120 can selectively utilize the information. For example, the client can be joined to a domain that provides different customization support and/or security such that a portion of the account information cannot be migrated. For example, domain security can limit client access to the Internet, and thus not provide the user with a means to customize the desktop with an icon that can be employed to launch an Internet browser. However, the account information being migrated may include a user profile with a configuration that includes a desktop icon for launching an Internet browser. Under such circumstances, the account management component 120 can mitigate attempts to migrate unsupported account customization.

In another aspect of the present invention, the account management component 120 can interact with the operator (e.g., via a GUI, UI and/or command line) to obtain input indicating the accounts to be generated, account mapping to account information, and/or a portion of the account information not to be migrated. For example, the interface can be utilized to select users from available users, for example from a combo box, drop-down-menu, and/or list box, wherein the selected users can indicate accounts to be generated. Then, account information for existing accounts can be mapped to the selected users.

In addition, the account management component 120 can encapsulate, if not already encapsulated, the information indicative of the accounts to be generated and the account information to be migrated within a file prior to generating the accounts and migrating the account information. Typically, the information is encapsulated within an XML based file (e.g., employing the exemplary XML pseudo-code 300, described below). However, it is to be appreciated that the invention is not so limited, and that other markup languages such as HTML, XHTML and DAML can be employed, as well as other file formats such as text files, compressed files (e.g., zip (including self-extracting), ARJ, arc, lha, RAR, zoo, StuffIt/sit, Tar and gzip), binary files, and encrypted files, for example.

The account management component 120 can then employ the file in connection with various account set up techniques in order to generate the accounts and to migrate the account information. For example, in one aspect of the present invention, the account management component 120 can generate an administration account that can be employed to facilitate account setup and account information migration. The administration account can include a self-logon mechanism, wherein after booting (e.g., power cycle or cold/hard boot or a warm/soft boot) the client, the administration account can automatically logon to the client. After automatically logging on to the administrative account, the account management component 120 can load the file to memory, and subsequently generate the accounts and migrate the account information. Typically, the account information is serially migrated. However, it is to be appreciated that in other aspects of the present invention, the accounts can be concurrently generated and/or the account information can be concurrently migrated.

The system 100 can be employed to generate accounts and migrate account information when joining the client to a domain, including joining a small business server (SBS). In general, joining the client to a domain includes interfacing the client to the domain for the first time, rejoining the client to the domain wherein the client was joined and then subsequently detached, and/or joining the client to a different domain (e.g., switching servers), for example.

Conventionally, existing account information is not preserved or utilized (e.g., destroyed, removed, written over, erased and the like) when the client is joined. Thus, generated accounts on the client are manually configured in order to return a user's custom configuration. The present invention can mitigate manual account configuration after joining the client for accounts associated with existing account information by providing a mechanism to migrate the account information to the generated account. Thus the present invention provides a novel technique to automatically resume user custom account configuration when joining a client to a domain. In addition, the novel technique can reduce the time consumed to setup the client and user accounts, which can reduce the cost associated with interfacing clients to a new or different domain.

Figure 2:
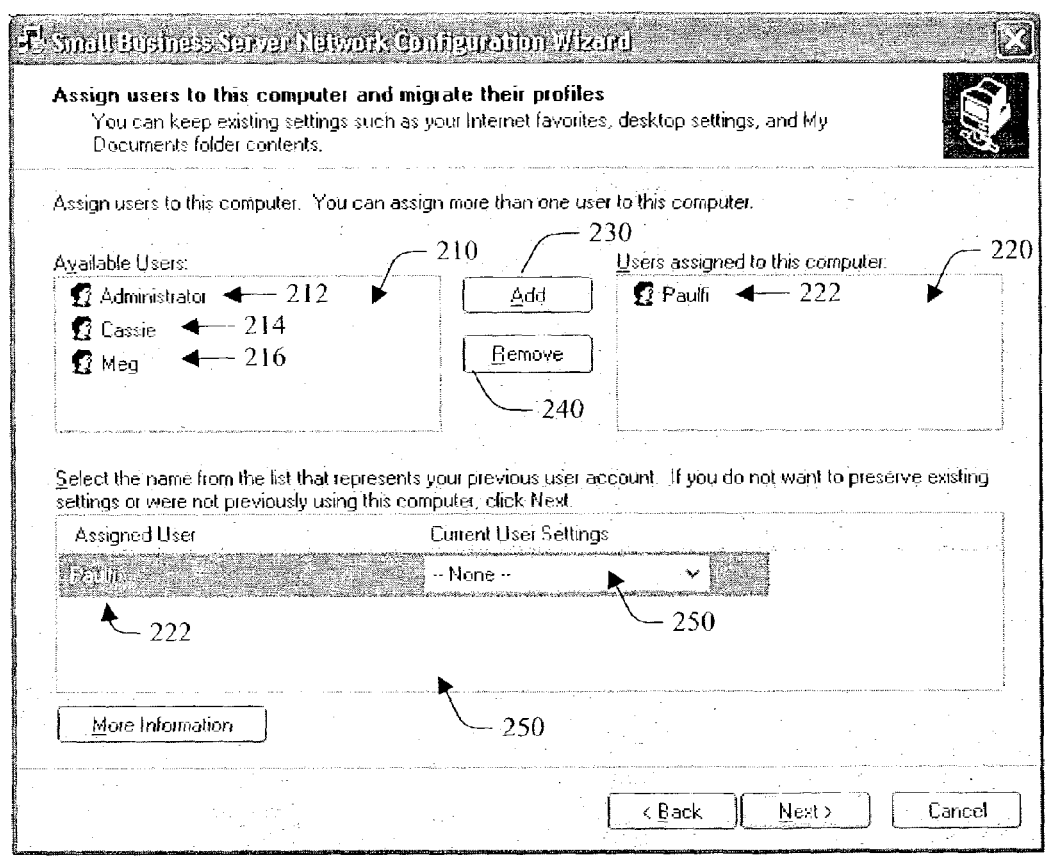
FIG. 2 illustrates an exemplary GUI that can be employed in accordance with an aspect of the present invention.

FIG. 2 illustrates an exemplary graphical user interface (GUI) 200 that can be employed to facilitate account generation and user profile migration when joining a client to a domain in accordance with an aspect of the present invention. The GUI 200 comprises an available user region 210, a selected user region 220, an add user mechanism 230, a remove user mechanism 240, a map user region 250, and a current setting region 260.

As noted previously, the system 100 can be employed in connection with and/or comprise an interface to obtain information indicative of the accounts to be generated and the user profiles to be migrated when joining a client to a domain. The GUI 200, described herein, illustrates an exemplary interface that can be employed with the system 100. However, it is to be appreciated that the following description does not limit the invention, and that other interfaces can be employed in accordance with an aspect of the present invention.

The available user region 210 provides the users (e.g., a user 212, a user 214 and a user 216) that can be assigned to the client, wherein accounts are generated for the assigned users. For example, a mechanism can be employed to determine the domain users. Then, in one aspect of the present invention, substantially all the users can be provided to the region 210. In another aspect of the present invention a filtering mechanism can be employed in connection with the mechanism that determines which domain users are granted permission to access the client after joining. For example, the filter can be employed to ensure user authentication, wherein authenticated users can be provided in region 210 for selection. Generating accounts for unauthenticated users can be mitigated by not providing such users in the region 210. In addition, a notification or other means can be utilized to inform a network administrator that particular users are not authenticated. In yet another aspect of the present invention, other filtering criteria can be employed. For example, the network administrator can utilize workgroups, security levels, properties and/or preferences to filter the users provided in the region 210.

The available user region 210 can be a list box as depicted, wherein the available users can be provided via a row-wise list of user identifiers such as user names, ID's, and/or icons, for example. In addition, the list box can optionally include vertical and/or horizontal scroll bars (not shown), which can be utilized to navigate within the list box. Furthermore, the list box can optionally include multiple columns to include additional information regarding the users. It is to be appreciated that other mechanisms can be utilized to provide the available users. For example, an edit control can be utilized to manually enter a user, a drop-down-menu can be employed to provide a list of users, and a combo box can be employed to provide a list of users as well as the ability to add a user.

Various techniques can be employed to select users in the available user region 210. For example, input devices such as a mouse, a keyboard, a keypad, a touch screen sensitive region, a pen, and/or a voice activation mechanism can be employed to highlight one or more users from the group of available users. In addition, check boxes and/or radio buttons can be employed in connection with the foregoing input devices. Furthermore, automatic selection employing mechanisms based on Bayesian theory, neural networks, statistical inferences, probability, and the like can be employed. For example, as a network administrator joins clients, the selection decisions can be stored in a log (e.g., a history file) to provide statistical information for automatic selection during subsequent joins.

The selected user region 220 can be employed to provide the users that were assigned for account generation from the available user region 210. Similar to the user region 210, and as depicted, the selected user region 220 can be a list box with selected users (e.g., a user 222) provided row-wise. Additionally, optional controls such as a vertical scroll bar, a horizontal scroll bar, additional columns, edit tools, drop-down-menus, combo boxes can be employed.

The add user mechanism 230 can be employed to assign users highlighted in the available user region 210 to the selected user region 220. The remove user mechanism 240 can be employed to remove users from the selected user region 220. The add user mechanism 230 and/or the remove user mechanism 240 can be control buttons, as depicted, and activated via devices such as a mouse, a keyboard, a keypad, a touch screen sensitive region, a pen, and/or a voice activation mechanism, for example.

The map user region 250 provides a means to map existing user profiles to the assigned users in the selected user region 220. For example, the user 222 from the selected user region 220 can be provided in the map user region 250 in connection with the current setting region 260. The current setting region 260 typically comprises a drop-down-menu, however it is to be appreciated that other mechanism, including the mechanism described herein, can be employed.

In general, the current setting region 260 can include a list of identified existing user accounts and an identifier to indicate existing account information will not be migrated. In one aspect of the invention, a default account can be automatically provided. For example, if it is determined that an existing account is associated with a user in the selected user region 220, then the existing account for the user can automatically be selected in the drop down menu. If the automatic selection is incorrect or if it is not desired to utilize the existing user profile, then the default selection can be changed. In another example, it can be determined that an associated existing account does not exist, and the identifier that indicates no migration can be automatically selected in the drop down menu. In another aspect of the invention, the default mapping option can be the no migration identifier. The drop down menu can then be employed to select a mapping, if desired.

Figure 3:
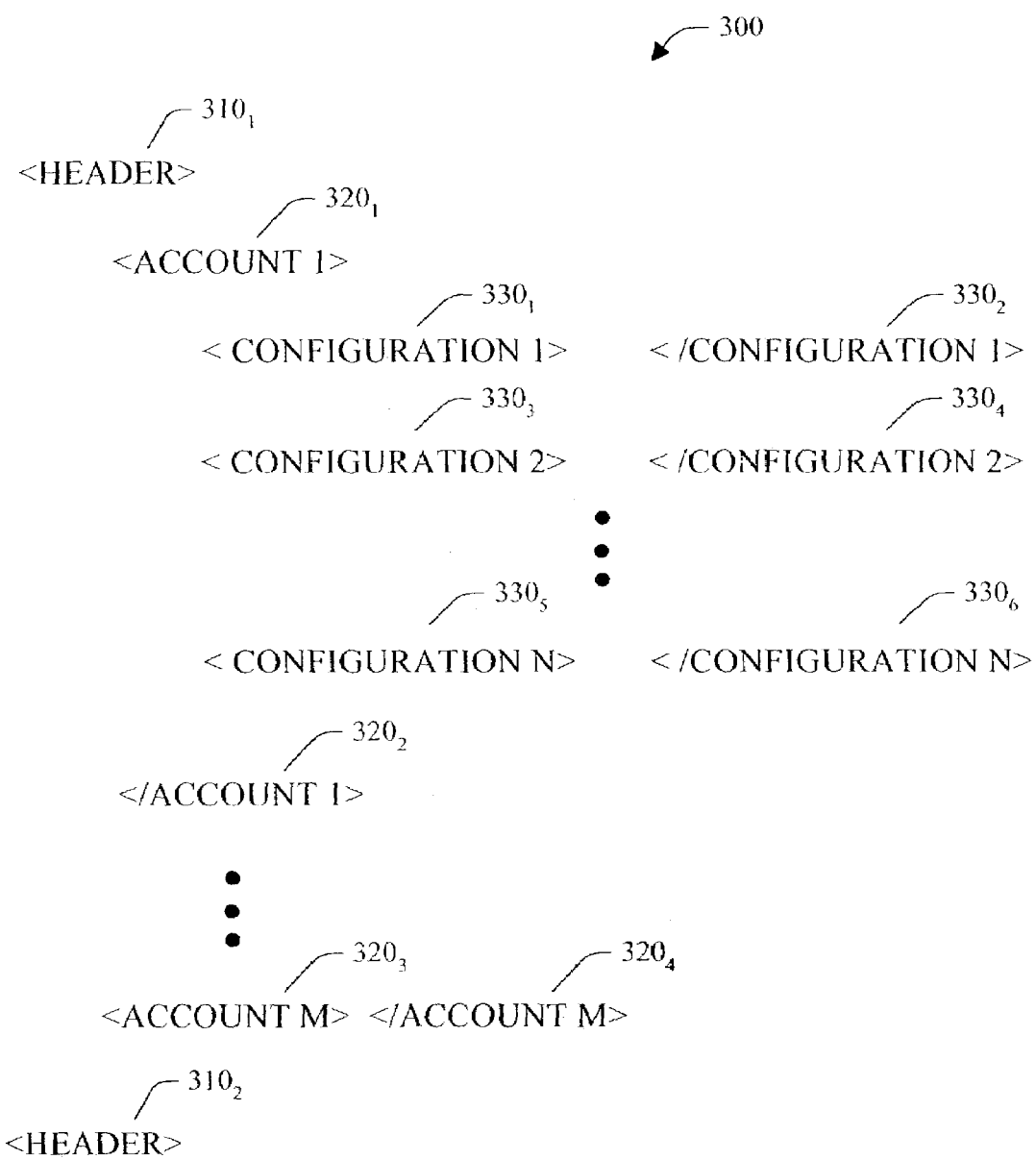
FIG. 3 illustrates exemplary XML pseudo-code that can be employed in accordance with an aspect of the present invention.

Proceeding to FIG. 3, exemplary XML-based pseudo code 300 that can be employed in accordance with an aspect of the present invention is illustrated. The pseudo code 300 comprises a header field $310_1$, a header field $310_2$, an account field $320_1$, an account field $320_2$, an account field $320_3$, an account field $320_4$, a configuration field $330_1$, a configuration field $330_2$, a configuration field $330_3$, a configuration field $330_4$, a configuration field $330_5$, and a configuration field $330_6$.

As noted supra, the information indicative of the accounts to generate and the user profiles to migrate can be embedded (e.g., included and encapsulated) within an XML file. The exemplary pseudo code 300 described herein illustrates exemplary XML-based pseudo code that can be employed with the system 100. It is to be appreciated that the following description does not limit the invention, and that other XML and non-XML based formats can be employed in accordance with an aspect of the present invention.

The header field $310_1$ can be utilized to designate the beginning of the information indicative of the accounts to be generated and the user profiles to be migrated, and the header field $310_2$ can be utilized to designate the ending of the accounts to be generated and the user profiles to be migrated. The header fields can hereafter collectively be referred to as header fields 310.

The account fields $320_1$-$320_4$ can be included within the header fields 310 to designate the accounts to be generated. For example, the accounts fields $320_1$-$320_2$ can be employed to designate a first account ("ACCOUNT 1") to be generated and the accounts fields $320_3$-$320_4$ can be employed to designate an Mth account ("ACCOUNT M") to be generated, wherein M is an integer greater than or equal to one.

The configuration fields $330_1$-$330_6$ can be included within the account fields $320_1$-$320_2$ to associate user profiles, and other account information, as described above, with the first account. For example, the configuration fields $330_1$-$330_6$ can comprise information indicative of the user profile for the first account, and/or a mapping to associate the user profile to the first account. It is to be appreciated that configuration fields similar to configuration fields $330_1$-$330_6$ can be employed with one or more of the account fields $320_1$-$320_4$. In addition, when it is desired that an existing user profile for an account should not be migrated, the configuration fields associated with the account can be omitted.

The exemplary pseudo code 300 can be employed as a basic architecture for the embedded file described in connection with system 100. Thus, the system 100 can obtain a file based on the pseudo code 300 in order to facilitate generating accounts and migrating account information on a client that is joined to a domain. In addition, the system 100 (e.g., the input component 110 and/or the account management component 120) can construct a file based on the pseudo code 300 that includes the accounts to be generated and the account information to be migrated. Furthermore, the system 100 can employ a file based on the pseudo code 300 in order to generate accounts and migrate account information on a client that is joined to a domain. For example, the account management component 120 or similar component can access the file based on the pseudo code 300 and employ the information within the account fields $320_1$-$320_2$ and the configuration fields $330_1$-$330_6$. For example, the account management component 120 can load the file based on the pseudo code 300 into memory, generate the accounts and migrate the user profiles.

Figure 4:
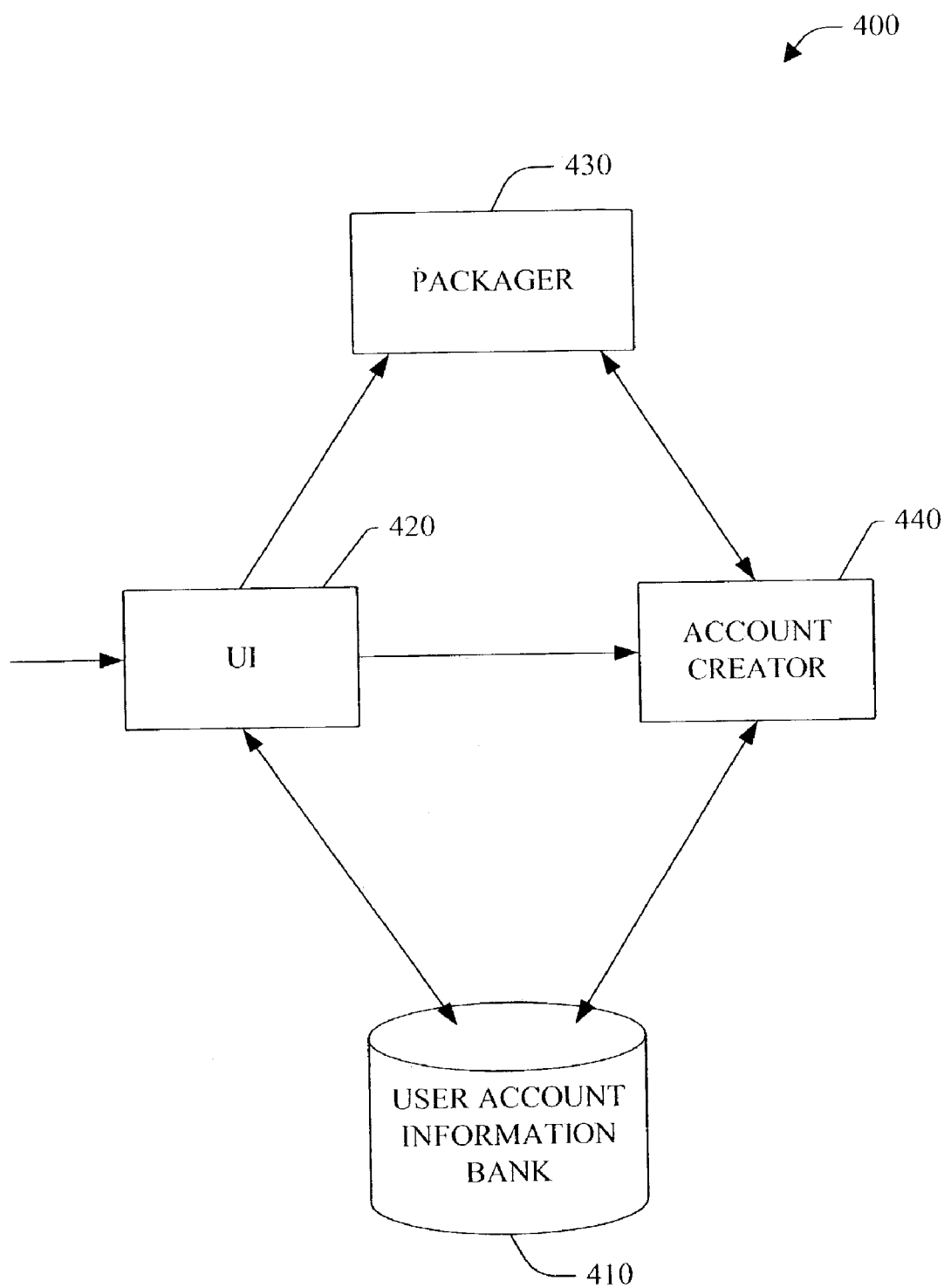
FIG. 4 illustrates an exemplary system to migrate user profiles when joining a client to a domain, in accordance with an aspect of the present invention.

Next at FIG. 4, an exemplary system 400 that can be employed to create accounts and map existing user profiles to the created accounts on a client when joining the client to a domain, in accordance with an aspect of the present invention, is illustrated. The system 400 comprises a storage medium 410, a UI 420, a packager 430, and an account creator 440.

The storage medium 410 can be local memory on the client, and can comprise volatile memory (e.g., random access memory (RAM) and cache memory) and/or non-volatile memory (e.g., hard disk). The storage medium 410 can be employed to save user accounts and account information such as user profiles. For example, after a user logs on to the client, a profile (e.g., a default profile) is created for the user, and can be stored in the storage area. As noted above, a user profile can comprise information such as account customization, attributes, settings, preferences, color schemes, themes, favorites and appearance, and can be concurrently and/or serially updated after the user changes the customization.

In a conventional system, the account information saved in the storage medium 410 is not preserved when the client is joined to a domain, and thus a user account generated during the join does not retain the customization previously provided by the user. If the user desires to return the customization, the user can manually configure the new account to be substantially similar to the previous account. However, manual configuration consumes time and is prone to error, which can be fatal and result in the need to rebuild the client. As described in detail below, the present invention improves the process of joining a client to a domain via providing a mechanism to automatically create accounts that employ existing user profiles, which can reduce client joining and account setup time, and decrease associated cost.

For example, in one aspect of the present invention, the UI 420 (e.g., GUI 200 and/or a command line interfaces) can be deployed in connection with joining a client to a domain. The UI 420 can be initiated as a stand-alone interface to facilitate selecting accounts to create and mapping account information and/or in connection with other interfaces, for example, a network setup interface, a client setup interface and/or a network configuration wizard. In addition, a network administrator and/or any of the foregoing interfaces can instantiate the UI 420.

The UI 420 can be utilized to provide the network administrator with the available domain users. As noted above, the available users can include substantially all the domain users or a subset thereof obtained via applying various filters and/or other criteria to the domain users. The network administrator can then serially and/or concurrently select users from the available users to designate which users will be provided with access to the client through an account.

The UI 420 can additionally be utilized to map existing account information to the selected accounts. For example, an account for a selected user could already exist on the client such as in connection with an account that was previously set up. As noted above, when an account is created the account and the user profile are typically saved, for example to the storage medium 410. The UI 420 can be utilized to designate a mapping between the saved user profile and the selected users. For example, where a previous user account existed, the previous account, and thus the user profile, can be mapped to the selected account associated with the user. In addition, UI 420 can be utilized to designate that a default user profile will be employed.

In one aspect of the present invention, the selected and mapped accounts can then be conveyed to the packager 430. The packager 430 can be employed to suitably package the selected and mapped accounts for employment by the account creator 440. For example, a file can be generated that can include information indicative of the selected and mapped accounts. For example, a markup language based file such as an XML (e.g., based on pseudo code 300), a HTML, a XHTML and/or a DAML file can be employed with the information. In another aspect of the present invention, the selected and mapped accounts can then be conveyed to account creator 440 without prior packaging. Then, the account creator 440 can transmit the selected and mapped accounts to the packager 430. Similar to above, the packager 430 can suitably package the selected and mapped accounts in an XML file. It is to be appreciated that various other techniques can be employed, for example, the information can be packaged within a non-markup language based file, or provided to the account creator 440 as a stream or burst of data, rather than a package.

The packager 430 can further be employed to include additional information within the XML file. For example, information signifying the order of account creation and/or account information immigration can be included in the file. In another example, a switch or flag can be set to inform the account creator 440 to log the executed instructions and results during account creation and account information migration in order to provide a means to troubleshoot errors and/or provide a historical record. In yet another aspect of the present invention, a unique identifier can be included in the file that can be utilized to verify that the file is valid and not a malicious attempt to create an account for an unauthorized user.

After packaging, the XML file can be provided to the account creator 440 for deployment during account creation and account information migration. In general, the account creator 440 will negotiate with the client's processor for control in order to coordinate the account creation and account information migration. Once in control, the account creator 440 can generate an administrative account with a mechanism to automatically log on after a system boot. Then, the account creator 440 can boot the client, and automatically log on and retain control.

Typically, the account creator 440 will load the file comprising the information indicative of the accounts to be created and migrated into memory, for example the storage medium 410. Then the account creator 440 can employ the contents of the XML file in connection with creating the accounts and migrating the account information. As noted supra, the created accounts and user profiles can be saved to the storage medium 410, wherein the information can be employed during user access. The account creator 440 can then serially and/or concurrently boot the client, destroy the administrative account and relinquish control back to the client's processor.

Figure 5:
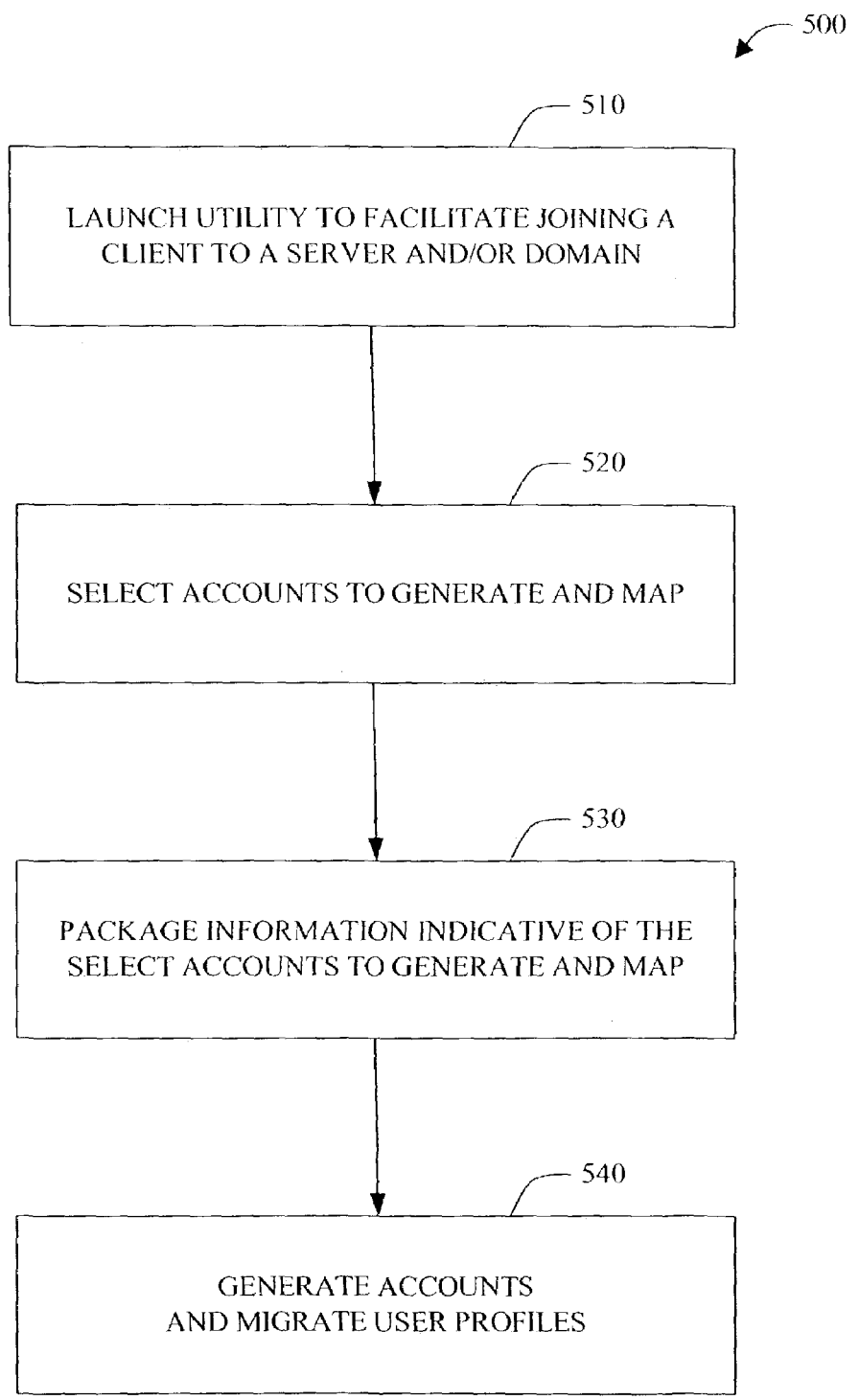
FIG. 5 illustrates a methodology that employs a user interface to facilitate migration of user profiles on a client during joining the client to a domain, in accordance with an aspect of the present invention.
Figure 6:
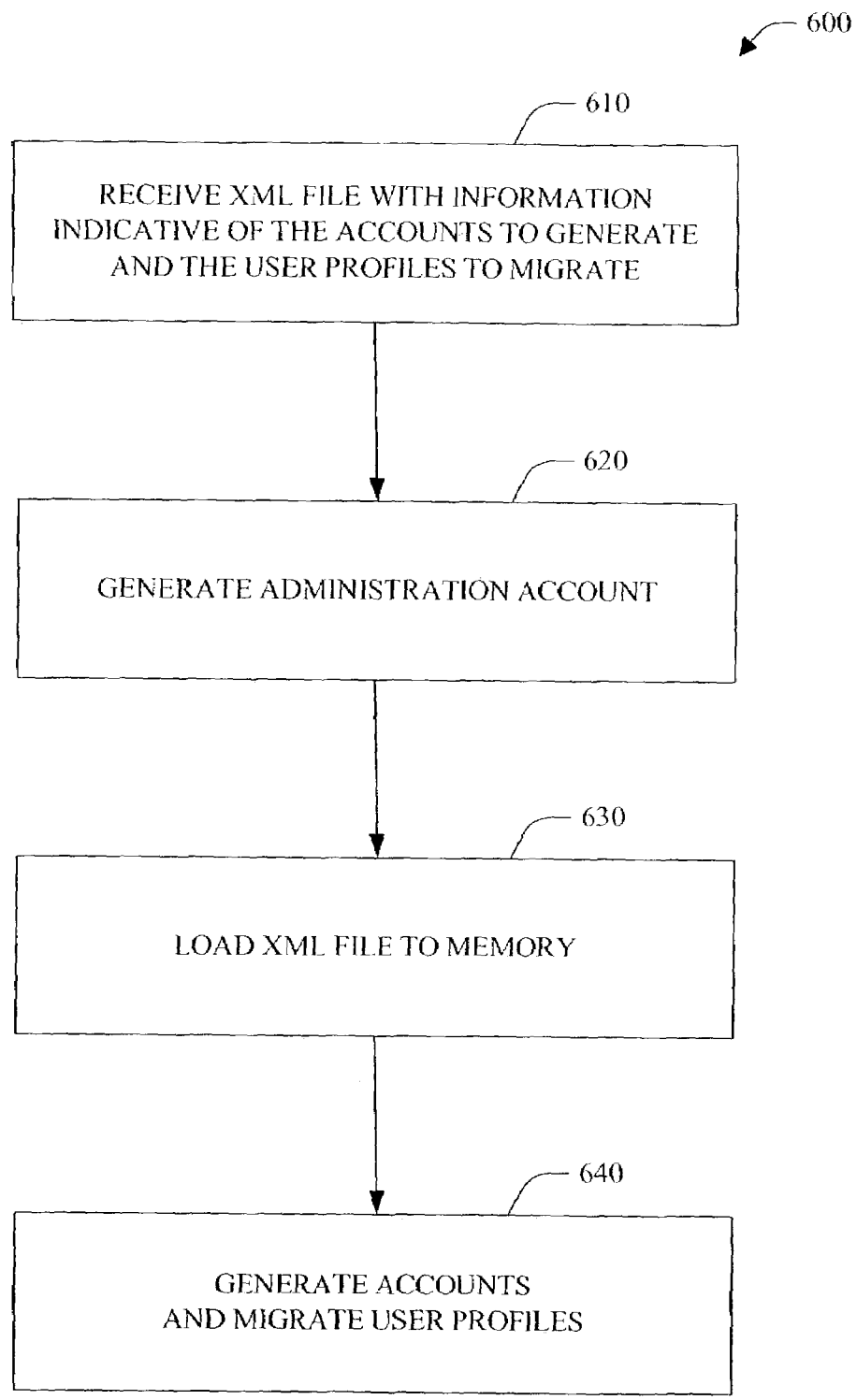
FIG. 6 illustrates a methodology that automatically generates accounts and migrates account information to the generated accounts on a client during joining the client to a domain, in accordance with an aspect of the present invention.

FIGS. 5-6 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement a methodology in accordance with the present invention. In addition, those skilled in the art will understand and appreciate that a methodology could alternatively be represented as a series of interrelated states (e.g., state diagram) or events.

Proceeding to FIG. 5, a methodology 500 that can be employed to generate accounts and migrate account information to the generated accounts on a client during joining the client to a domain in accordance with an aspect of the present invention is illustrated.

At reference numeral 510, a user interface is deployed. The user interface can be a graphical user interface or command line interface, for example. The user interface can be employed to provide a group of users comprising the users that can access the client. It is to be appreciated that one or more users in the group of users can have an existing account in the client. However, when the client is joined to the domain, the existing account and associated information such as the user profile is not preserved.

Next at 520, users are selected from the group of available users. The selected users designate users that will be provided with an account after client joining. In one aspect of the present invention, selection can be achieved via highlighting users and employing a mechanism to assign the highlighted users to a group of selected users. Fore example, an input device such as a mouse, a keyboard, a keypad, a touch screen sensitive region, a pen, and/or a voice activation mechanism can be employed to highlight one or more users from the group of available users and initiate the assignment. In another aspect of the present invention, a script can be employed from a command line that provides the assigned users. In yet another aspect of the present invention, individual users can be entered from the command line.

After constructing the group of assigned users, existing accounts can be mapped to the assigned users in order to migrate the user profile and other account information to the generated account. Similar to selecting users for assignment, input device such as a mouse, a keyboard, a keypad, a touch screen sensitive region, a pen, and/or a voice activation mechanism can be employed to facilitate mapping. In general, accounts that are not associated with an existing account are not mapped, and accounts that are associated with an existing account can be or not be mapped. Mapping provides a mechanism to retain custom account configuration after the client is joined to the domain. For example, if an account that is associated with an existing account is not mapped to the existing account, then after joining the client the customization will not be retained, and if an account that is associated with an existing account is mapped to the existing account, then after joining the client the customization will be retained.

At reference numeral 530, a file is generated that includes information indicative of the accounts assigned for generation and the accounts mapped for user profile migration. As noted above, the file is typically an XML-base filed. It is to be appreciated that in other aspects, a plurality of individual files can be constructed wherein an individual file can correspond to a user account and associated mapping. In addition, a master file can then be constructed that includes paths to the individual files and/or other means such the individual files can be accessed.

At 540, the XML file(s) can be employed to generate accounts and migrate the account information to the generated accounts. For example, an administrative account with a self-logging mechanism can be created. Then, the client can be booted, wherein the administrative account will automatically log on. After logging on, the XML file with the information indicative of the accounts to be generated and the account information to be migrated can be loaded in to memory, and employed to generate the accounts and migrate the account information. Then, the client can be booted, wherein a user with an account can log on to the client, and be provided with the customization of the previous account.

FIG. 6 illustrates a methodology 600 to generate accounts and migrate account information to the generated accounts on a client during joining the client to a domain in accordance with an aspect of the present invention.

Proceeding to reference numeral 610, a request to facilitate account set up and account information migration is received. Then, an XML-based file that includes information indicative of the accounts to be generated and the account information to be migrated is obtained. Next at 620, an administrative account is generated, wherein the administrative can be employed to automatically log on after a client boot and coordinate account generation and account information migration.

After a client boot, the administrative account can be employed to load the XML file at 630. Once loaded, the content of the XML file can be employed in connection with account generation and account information migration at 640. For example, the content of the XML file can be utilized to indicate the accounts to be generated and provide the mapping between any previous account information and the generated account.

Figure 7:
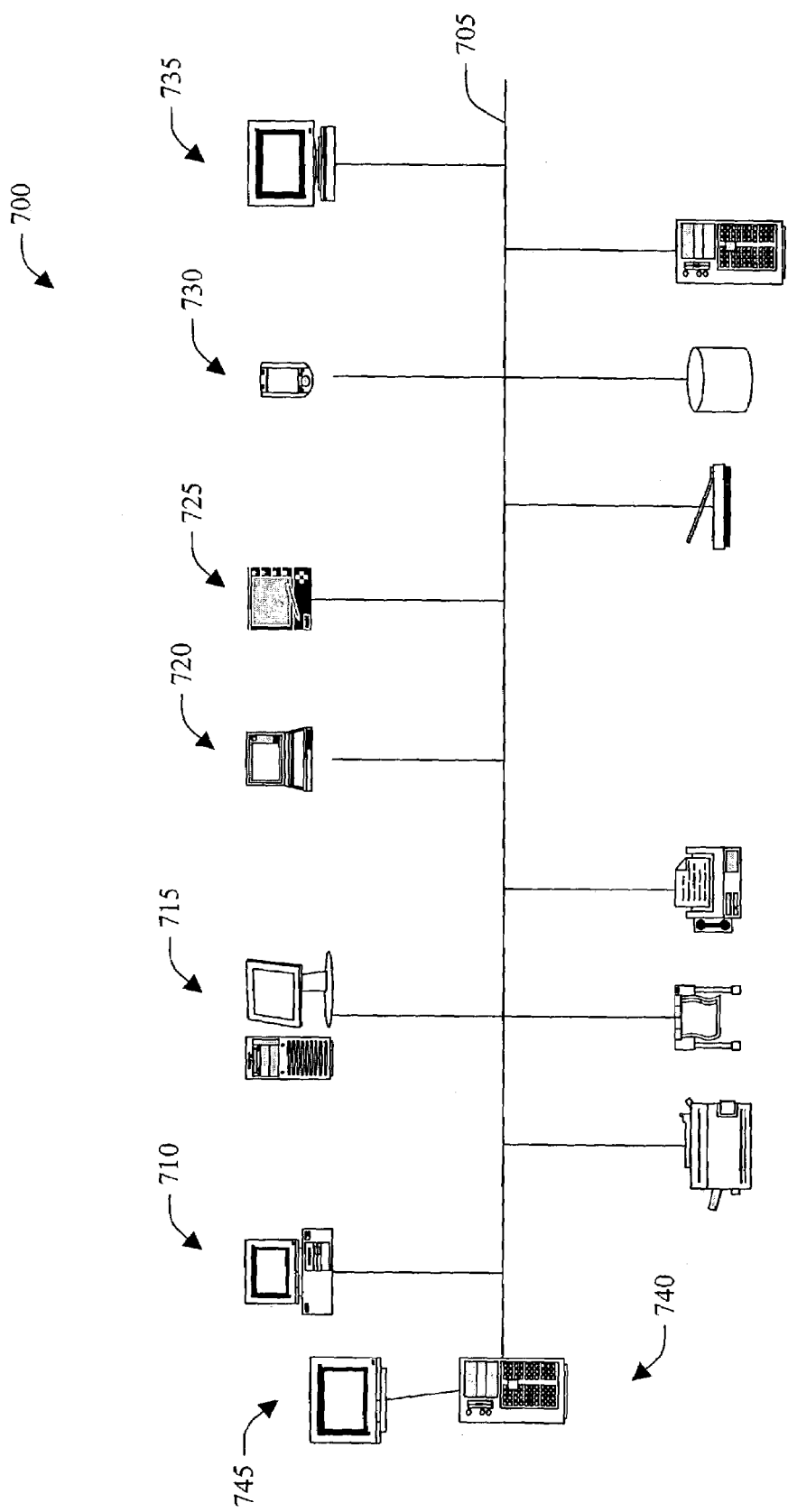
FIG. 7 illustrates an exemplary system to remotely setup clients on a network, in accordance with an aspect of the present invention.

FIG. 7 illustrates a system 700 that can be employed to remotely setup clients on a network in accordance with an aspect of the present invention. The system 700 includes a network 705, a client 710, a client 715, a client 720, a client 725, a client 730, a client 735, and a server 740.

The network 705 (e.g., an intranet or internet) can be employed to interface (e.g., via twisted pair, coaxial cable, fiber optics and wireless technology (e.g., radio frequency)) the clients 710-735 and the server 740, and optionally, a printer, a plotter, a facsimile, a scanner, a database, and another server. The network 705 can be any known type of network such as a Local Area Network (LAN), a Wide Area Network (WAN), a Campus Area Network (CAN), a Metropolitan Area Network (MAN), and a Home Area Network (HAN). In addition, various protocols (e.g., Ethernet (including Gigabit) and TCP/IP) can be employed in connection with the network 705. The network 705 can be based on a client/server architecture, as depicted; however, it is to be appreciated that other architectures such as peer-to-peer architecture can be employed in accordance with an aspect of the invention.

The clients 710-735 can be personal computers, workstations, laptops, hand held computes, pen computers, and the like. A client, for example client 710, can execute applications that reside locally, on the server and/or on at least one of the other clients 715-735, if permission is granted. In general, when a user with an account logs on to the client 710 for the first time, a profile (as described herein) associated with the user is generated on the client 710. The client then utilizes the profile during subsequent logons by the user in order to resume the configuration to the user. When the user customizes the configuration, the user's profile can be updated to reflect the customization, and the updated profile can be employed during a subsequent logon to resume the customization.

Typically, more than one user can be provided with an account on the client 710, and therefore more than one profile can reside on the client 710. For example, when the Nth user logs on to the client, an Nth profile is generated, wherein the Nth profile is associated with the Nth user and is employed by the client 710 during,subsequent logons by the Nth user. In addition, the individual clients 710-735 can generate individual profiles. For example, a user can have an account with one or more of the clients 710-735, wherein the user's profile associated with the clients 710-735 can be substantially different or similar. For example, a user can customize the desktop on the client 710 to include an icon to launch a word processing application while retaining the default desktop on the client 715.

The server 740 can be employed to set up and maintain the clients 710-735, facilitate interaction amongst the clients 710-735, and provide utilities such as shared applications to the clients 710-735. For example, the server 740 can employ the systems and methods described herein (e.g., system 100) to generate accounts, and migrate user profiles and other account information (e.g., documents associated with the user) to the generated accounts in order to retain account customization during joining a client to the network 705. For example, when a client is being joined to the network 705, the server 740, in connection with system 100, can launch an interface to interact with a network administrator that facilitates establishing which users will be provided with access to the client being joined. For example, the interface can provide the network administrator with a list of the available users. The network administrator can select at least one user from the list of available users, wherein a selected user designates a user that will be provided with an account when accounts are generated. After selecting a user, the interface can provide a mechanism to map a previously established account on the client to the user. The mapping can be utilized during account generation to migrate the profile for the previously established account to the generated account.

As noted supra, information indicative of the accounts to generate and the profiles to migrate can be included within an XML or other markup language based file. The file can then be employed to generate the accounts and migrate the profiles on the client. For example, the server 740 can logon to the client as the administrator after booting or logging off the client. The server 740 can then load the XML file to the local memory of the client. Then, the server 740 can generate the accounts, migrate the profiles, and subsequently log off the client.

In addition, to setting up a client during joining the client to the network 705, the server 740 can employ the systems and methods described herein to port a profile from one of the clients 710-735 to at least one of the other clients 710-735. For example, the network administrator can copy a profile from the clients 710 and port it to one or more of the other clients 715-735. For example, after copying the profile, the server 740 can logon to one or more of the other clients 715-735, and port the copied profile. In one aspect of the present invention, if a profile already exists, the ported profile can replace the existing profile. In another aspect of the present invention, the existing profile can be archived prior to porting the copied profile.

It is to be appreciated that the copied profile can be employed during joining a client to the network. For example, and as noted above, an interface can be launched to interact with a network administrator to facilitate establishing which users will be provided with access to the client. After selecting users that will be provided with an account, previously established accounts and copied profiles can be mapped to the selected users. When a previously established account is mapped, the profile associated with the previously established account is migrated to the generated account, as described above. When a copied profile is mapped to a selected user, the copied profile is ported to the generated account for the user.

Figure 8:
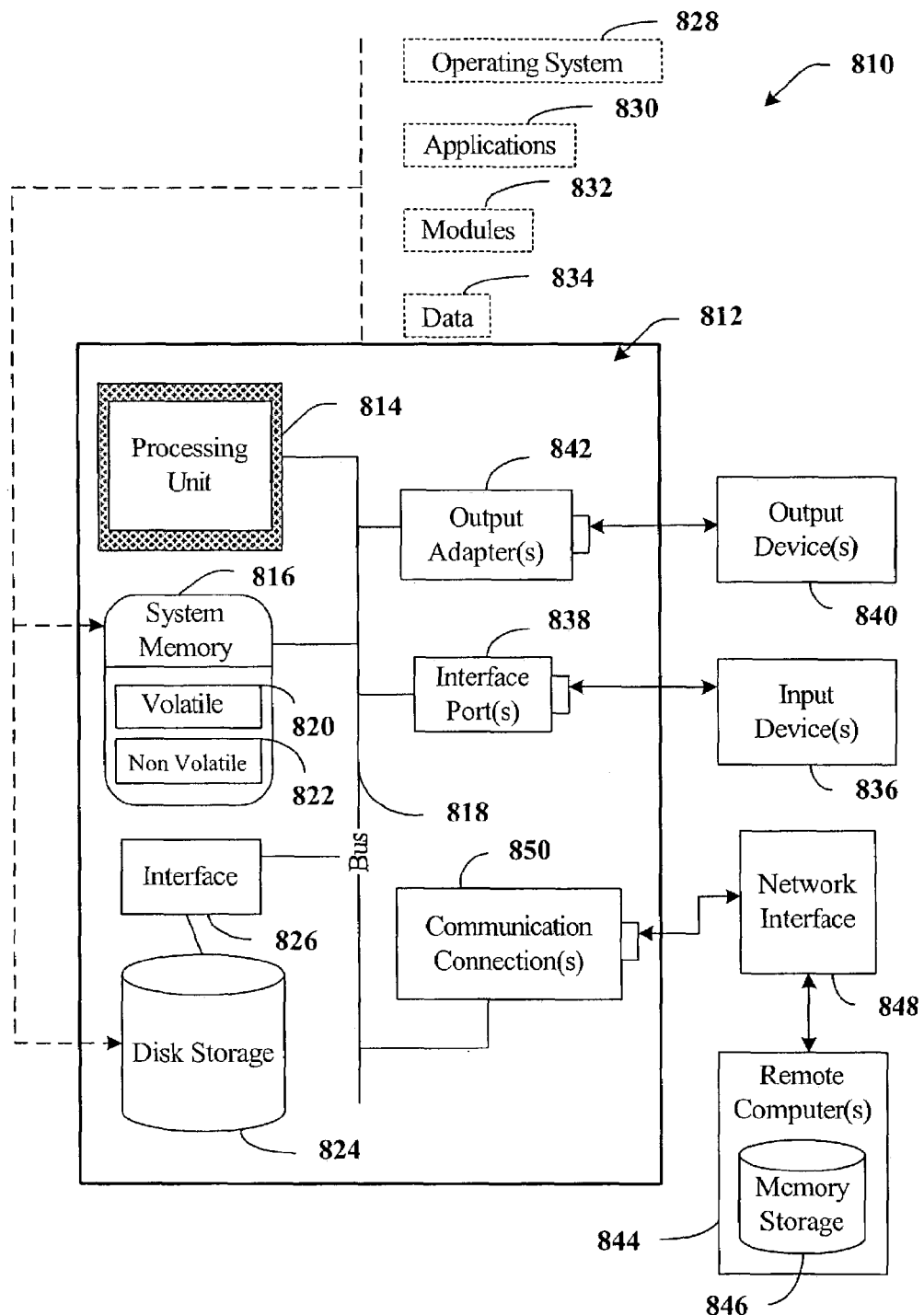
FIG. 8 illustrates an exemplary operating system in accordance with one aspect of the present invention.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, in microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like.

These and other input devices connect to the processing unit 8 14 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the term "includes" and variants thereof are used in the detailed description or the claims, these terms are intended to be inclusive in a manner similar to the term "comprising."

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

What is claimed is:

1. A system that migrates account information from existing accounts to generated accounts during joining a client to a domain, comprising:
an input component that obtains
information indicative of
the accounts to be generated and
the account information to be migrated during joining the client to the domain,
an account management component that employs
the information indicative of
the accounts to be generated and
the account information to be migrated to generate the accounts and migrate the account information from
the existing accounts to
the generated accounts,
wherein the account management component is further employed to
boot the client after
account generation and
user profiles migration,
destroy an administrative account and
relinquish control back to the client's processor.

2. The system of claim 1, the account information comprising one or more user profiles.

3. The system of claim 2, the one or more user profiles comprising at least one of account customization, account configuration, an account attribute, an account setting, an account preference, an account color scheme, and an account theme.

4. The system of claim 1, the information indicative of the accounts to be generated and the account information to be migrated embedded in a file.

5. The system of claim 4, the file comprising one of a markup language file, a compressed file and an encrypted file.

6. The system of claim 5, the markup language file comprising one of an XML, an HTML, an XHTML and a DAML based file.

7. The system of claim 1, the information indicative of the accounts to be generated comprising at least one of a list of accounts to be generated, indicia signifying one or more users, and an association between the existing accounts and the accounts to be generated.

8. The system of claim 1, the information indicative of the account information to be migrated comprising at least one of the account information and a mapping between the account information and the accounts to be generated.

9. The system of claim 1, the input component employed in connection with an interface in order to obtain the information indicative of the accounts to be generated and the account information to be migrated.

10. The system of claim 9, the interface component comprising one of a user interface (UI), a graphical user interface (GUI) or a command-line interface.

11. The system of claim 10, the GUI employing at least one of a combo box, a drop-down-menu, and a list box.

12. The system of claim 1, the account management component further comprising generating an administration account that automatically logs on after a client power cycle, hard boot or soft boot, and loads the information indicative of the accounts to be generated and the account information to be migrated into memory.

13. The system of claim 1, the account management component migrating the account information serially and/or concurrently.

14. The system of claim 1, employed when joining the client to a small business server (SBS).

15. A system that creates accounts on a client and migrates user profiles to the created accounts during joining the client to a domain, comprising:
- a graphical user interface that obtains information indicative of the accounts to be created and the user profiles to be migrated;
- a packaging component that encapsulate the information indicative of the accounts to be created and the user profiles to be migrated, and
- an account creator that employs the encapsulated information during joining the client to the domain to create the accounts and migrate the account information to the created accounts the account creator employed to boot the client after account generation and user profiles migration, destroy an administrative account and relinquish control back to the client's proessor.

16. The system of claim 15, the packaging component encapsulating the information indicative of the accounts to be created and the user profiles to be migrated within a file.

17. The system of claim 16, the file comprising one of a markup language file, a compressed file or an encrypted file.

18. The system of claim 17, the markup language file comprising one of an XML, an HTML, an XHTML or a DAML based file.

19. The system of claim 15, the information indicative of the accounts to be generated comprising at least one of a list of accounts to be generated, indicia signifying one or more users, or an association between the existing accounts and the accounts to be generated.

20. The system of claim 15, the information indicative of the account information to be migrate comprising at least one of the account information and a mapping between the account information and the accounts to be generated.

21. The system of claim 15, the account creator migrating the account information serially and/or concurrently.

22. The system of claim 15, the account creator negotiating with the client's processor for control in order to coordinate account creation and user profile migration.

23. The system of claim 15, the account creator further comprising generating an administration account that automatically logs on the client, loads the encapsulated information to memory, and employs the encapsulated information in connection with creating the accounts and migrating the user profiles.

24. The system of claim 15, the GUI employing at least one of a combo box, a drop-down-menu, a list box, and an edit control.

25. The system of claim 15, the GUI comprising at least an available user region, a selected user region, an add user mechanism, a remove user mechanism, a map user region, and a current setting region.

26. The system of claim 25, the map user region providing a means to map existing user profiles to users denoted in the selected user region.

27. The system of claim 25, the selected user region providing a list of assigned users, the list comprising at least one of a user name, a user identification (ID) or a icon associated with a user.

28. The system of claim 25, the available user region employed to provide a list of available users comprising at least a subset of the domain users.

29. The system of claim 28, employed in connection with a filter mechanism to filter the domain users to provide a list of available users based on a filter criteria.

30. The system of claim 29, the filter criteria comprising at least one of authentication, security, workgroup, a property or a preference.

31. The system of claim 28, employed in connection with an input device to assign users from the list of available users.

32. The system of claim 31, the input device comprising at least one of a mouse, a keyboard, a keypad, a touch screen sensitive region, a pen, or a voice activation mechanism.

33. A method to generate accounts and migrate user profiles to the generated accounts on a client during joining the client to a domain, comprising:
- selecting users from a group of users that can access the client;
- mapping the selected users to existing user profiles accounts;
- generating users accounts for the selected users;
- migrating the user profiles to the generated accounts;
- booting the client after the users accounts generation and the user profiles migration; and
- destroying an administrative account and relinquishing control back to the client's processor.

34. The method of claim 33, further comprising deploying a user interface to provide the group of users, wherein the group of users comprises at least a subset of the domain users.

35. The method of claim 33, further comprising constructing an XML file with information indicative of the selected user accounts and the mapped user profiles.

36. The method of claim 35, further comprising employing the XML file in connection with generating the user accounts and migrating the user profiles.

37. The method of claim 35, further comprising generating an administration account to automatically logon to the client and load the XML file to memory.

38. A method to migrate user profiles to accounts generated during joining the client to a domain, comprising:
- receiving an XML file comprising information indicative of accounts to be created and the user profiles to be migrated;
- loading the XML file to memory;
- generating users accounts based on the information indicative of the accounts to be created;
- migrating the user profiles based on the information indicative of accounts to be migrated;
- booting the client after the users accounts generation and the user profiles migration;
- destroying an administrative account; and
- relinquishing control back to the client's processor.

39. A computer readable medium storing computer executable components to migrate user profiles during joining a client to a domain, comprising:
- a component to obtain information indicative of accounts to generate and user profiles to migrate;

a component to encapsulate the information indicative of the accounts to generate and the user profiles to migrate;

a component to employ the encapsulation to generate the accounts and migrate the user profiles to the generated accounts; and a component to boot the client after the accounts generation and the user profiles migration and destroy an administrative account and relinquish control back to to the client's processor.

40. A system to migrate user profiles during joining a client to a domain, comprising:

means for obtaining information indicative of at least one account to generate and at least one user profile to migrate;

means for embedding the information indicative of at least one account to generate and at least one user profile to migrate within a file;

means for automatically logging on to the client;

means for employing the contents of the embedded file to generate the at least one account and to migrate the at least one user profile to at least one generated account;

means for booting the client after the at least one account generation and the at least one user profile migration; and means for destroying an administrative account and relinquishing control back to the client's processor.

* * * * *

UNITED STATES PATENT AND TRADEMARK OFFICE
CERTIFICATE OF CORRECTION

| | | |
|---|---|---|
| PATENT NO. | : 7,320,068 B2 | Page 1 of 1 |
| APPLICATION NO. | : 10/455048 | |
| DATED | : January 15, 2008 | |
| INVENTOR(S) | : Jeff A. Zimniewicz et al. | |

It is certified that error appears in the above-identified patent and that said Letters Patent is hereby corrected as shown below:

In column 19, line 29, in Claim 15, delete "accounts" and insert -- accounts, --, therefor.

In column 19, line 32, in Claim 15, delete "proessor." and insert -- processor. --, therefor.

In column 19, line 36, in Claim 17, delete "T he" and insert -- The --, therefor.

In column 21, line 9, in Claim 39, after "to" delete "to".

Signed and Sealed this

Fifteenth Day of February, 2011

David J. Kappos
*Director of the United States Patent and Trademark Office*